United States Patent

Pearson et al.

[15] 3,639,748
[45] Feb. 1, 1972

[54] BUMPER STRUCTURE HAVING A LIGHT FIXTURE ASSOCIATED THEREWITH

[72] Inventors: Charles J. Pearson, Akron; Keith D. Robinson, Mogadore; William O. Sassaman, Akron, all of Ohio

[73] Assignee: The Goodyear Tire & Rubber Company, Akron, Ohio

[22] Filed: Nov. 27, 1970

[21] Appl. No.: 93,422

Related U.S. Application Data

[63] Continuation of Ser. No. 763,207, Sept. 27, 1968, abandoned.

[52] U.S. Cl. ..........................................240/7.1 G, 293/71 R
[51] Int. Cl. ...........................................................G60g 1/00
[58] Field of Search .............................240/7.1 R, 7.1 G, 8.3; 293/71 R, 69

[56] References Cited

UNITED STATES PATENTS

| | | |
|---|---|---|
| 1,572,024 | 2/1926 | MacInnes..........................240/7.1 X |
| 2,280,558 | 4/1942 | Thompson........................240/7.1 X |
| 2,533,212 | 12/1950 | Balmer..............................240/7.1 |
| 2,730,396 | 1/1956 | Johnson................................293/71 |
| 3,473,836 | 10/1969 | Halter.................................293/71 X |

Primary Examiner—Samuel S. Matthews
Assistant Examiner—Russell E. Adams, Jr.

[57] ABSTRACT

This invention relates to a bumper structure having a light fixture associated therewith where the bumper body has one face of resilient, translucent material in the areas where the light would shine through, means for attaching the bumper structure to the vehicle, means for attaching the lights to a signal activator and a power supply.

2 Claims, 3 Drawing Figures

PATENTED FEB 1 1972         3,639,748

INVENTORS
CHARLES J. PEARSON
KEITH D. ROBINSON
BY WILLIAM O. SASSAMAN
ATTORNEY

BUMPER STRUCTURE HAVING A LIGHT FIXTURE ASSOCIATED THEREWITH

This application is a continuation of Ser. No. 763,207, now abandoned.

This invention relates to a method for making bumpers for use on vehicles with an improved means for incorporating the lights commonly used for visibility and/or signalling purposes and to said product.

Heretofore the bumper structures for vehicles have consisted essentially of a metal strip extending around the front or rear end of the vehicle. Recently there has been some commercial utilization of rubber elastomeric material laminated to a metal strip for styling or damage reduction effects. In the bumper structures used heretofore it has been customary to locate the lights and other signal features in the bumper in a recessed position and then cover the light with a glass fixture which was readily broken under impact to leave the vehicle frequently without a cover for the lights or no lights at all. Also, this fixture was usually chrome plated and thus its cost was increased by the plating operation.

It is the object of this invention to provide a bumper made primarily of translucent or transparent elastomeric material which would eliminate the need for glass or plastic lens covering over the light fixture, thus eliminating possible breakage or damage on impact and also eliminating the need for the associated accessories for attaching the glass or cover plate over the light fixture that is in many instances chrome plated.

This object and other advantages of this invention may more readily be understood by reference to the drawings wherein FIG. 1 is a front elevational view of a bumper structure and a signal light fixture combination;

Figure 1:
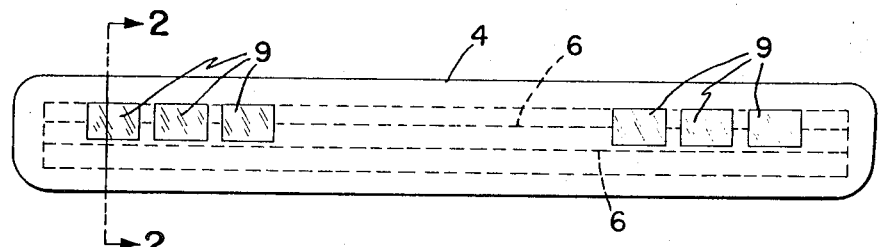

Referring specifically to FIG. 1 it will be noted that the bumper structure shown is of the type that would extend around the front or rear of an automobile and has a series of windows therein to permit the lights recessed within or behind the bumper structure, when activated, to be seen by a person in an oncoming vehicle.

Figure 2:
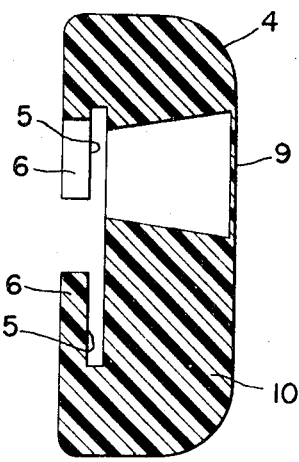
FIG. 2 is a cross section through FIG. 1 along the lines 2—2.
Figure 3:
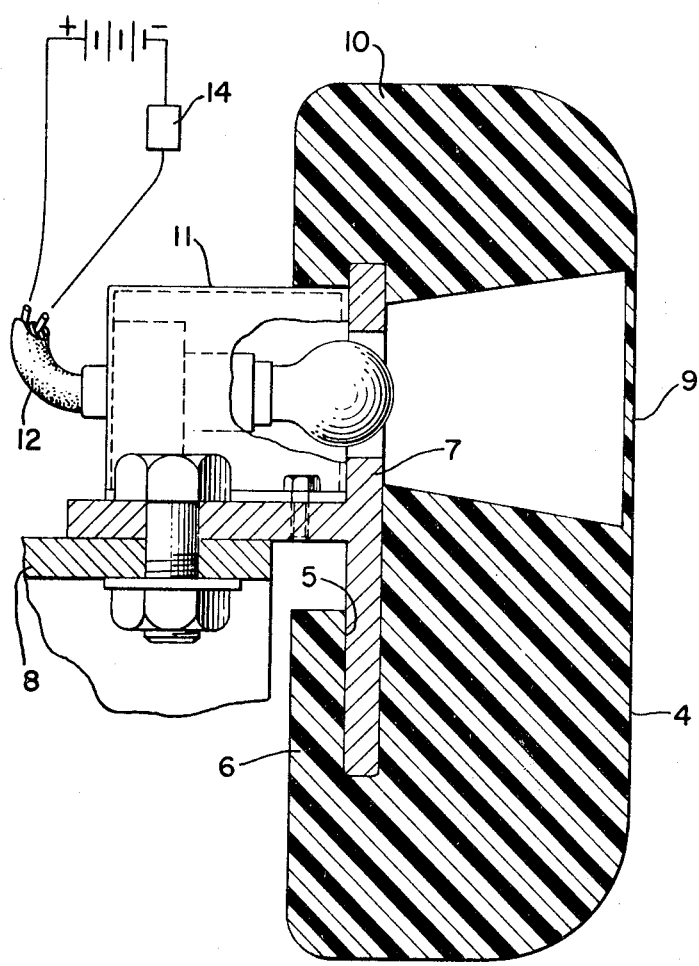
FIG. 3 is another view slightly enlarged of FIG. 2 wherein a means for attaching the bumper structure to the vehicle is shown within the bumper structure.

In general, the bumper structure 4 comprises an elastomeric material extending around the end or area of the vehicle to be protected. Referring specifically to FIG. 2 it will be seen that the bumper structure is designed to include necessary grooves 5 and/or flanges 6 to receive means for attaching to the vehicle. Or, it may be designed so that the necessary metal armature or metal attaching brackets 7 are integrally molded or bonded to the elastomeric structure to enable the bumper to be assembled or attached to the vehicle 8.

It should be noted that each of the windows 9 in the bumper is an integral part of the elastomeric material 10. Such windows can be provided by various means, but in general, can be prepared by masking or blocking the area or areas which are desired to be translucent or transparent with suitable masking material or blocking device and then coating the bumper with a suitable opaque paint to give it the desired color and/or finish. Then the masking material (for instance, a masking tape) is removed to leave translucent or transparent windows in the bumper. Necessary openings or recesses are provided within the bumper mass or near the outer surface to receive and contain the light fixtures. The light fixtures 11 are connected by suitable electric conductors 12 to a power source such as a battery and to a signal activation switch 14 or similar means. When activated, the light shines through the translucent or transparent areas only to give the desired lighting effect, or the lights can be activated and caused to shine in a desired sequence to give specific or unusual effects which may be desired, as in signalling.

The translucent windows or areas can be almost any desired color. For instance, to provide red signal lights, the bumper would be made of a transparent red colored elastomeric material. The areas desired for the red signal lights would be masked or blocked with a suitable tape. Then the bumper is painted with a suitable opaque paint to give it the desired color or finish. When the masking material is removed, the window areas for the signal lights will be red. Another method would be to make the bumper of a clear noncolored translucent material. The signal light areas can also be painted with translucent paint of any desired color such as red, amber, white, etc., while the remainder of the bumper is painted in an opaque color and finish using suitable opaque colored paint. Or the signal light bulbs could be red, amber, white, etc., colored and the windows could be a clear translucent or transparent material with the remainder of the bumper painted in any desired color using opaque paints. Thus, more than one colored signal can be incorporated in a single bumper.

The light may be activated and caused to shine in the desired sequence depending upon the manner in which the signal activator has been programmed or is activated.

The nature, objects and advantages of this invention are further illustrated in the representative and illustrative examples where the parts are by weight unless otherwise stated.

EXAMPLE I

A silicone rubber bumper mold suitable for casting a bumper of the type shown in the drawings was placed in a retaining or rigidizing mold. Then sufficient amounts of the liquid or fluid polyurethane mixture described hereinafter was added to the silicone mold and the mold was rocked back and forth to coat the inside of the mold with the polyurethane mixture which reacted and set to give a rind or skin about one thirty-second to one-sixteenth inch thick. The metal attaching brackets were then positioned within the mold at appropriate spacings to permit the bumper to be attached by the brackets to the vehicle. Also, plastic or metal light receptacles were placed in the mold at the desired places and the rind or skin served as a cover for the receptacle.

The bumper was cast by pouring into the mold more of the fluid or liquid polyurethane mixture composed of 100 parts of Adiprene L (a commercial prepolymer of polytetramethylene ether glycol and toluene diisocyanate) and 10 parts of methylene dichloroaniline having dispersed therein 0.01 parts of a red quinacridine dye (Perox No. 6 from Patent Chemical) for each 100 parts of Adiprene L. The mixture was allowed to react and set at room temperature overnight and then the silicone mold was stripped away from the polyurethane bumper containing the light receptacles and mounting brackets.

Other bumpers were made in the same manner except different dyes were used. The various dyes were commercial dyes of the Monastral Blue (phthalocyanine blue), phthalocyanine green, benzidine yellow, Hansa yellow, titanium oxide and yellow pigment of hydrated ion oxide type.

The area of the bumper to serve as the lens for the light was masked with masking tape and then the rest of the bumper was spray painted with a commercial opaque automobile paint with the color being chosen to give the bumper the desired color match for the vehicle body on which it was to be used. For instance, if the vehicle body was for a Ford Mustang, then a commercially approved automobile paint for the desired color, make and model would be used.

The dyes or pigments useful in this invention are those well known to the paint technologist and are generally described in the textbook "Organic Chemistry" by William T. Caldwell, 1943, published by The Riverside Press, Cambridge, Mass.

In addition to the translucent or transparent polyurethanes of the polyester, polyether and hydrocarbon types, other representative translucent elastomers are the silica loaded natural rubbers, polybutadiene styrene, neoprenes, cis polyisoprenes, polybutadienes, nitrile rubbers, plasticized vinyl resins and flexible polyacrylates. These translucent elastomers can be used instead of the polyurethane where the bumper body is formed by injection or transfer molding or other methods of shaping and curing these elastomers.

EXAMPLE II

A metal bumper mold of the male and female type was treated with a polyethylene mold release agent and then a polyurethane reaction mixture composed of 100 parts of Adiprene L and 10 parts methylene dichloroaniline and 0.01 parts of quinacridine dye for each 100 parts of Adiprene L was poured into the female cavity of the mold and the mold was closed to bring the male and female parts of the mold in proper juxtaposition to form the bumper in the desired contour. After letting the polyurethane reaction stand in the mold overnight at 75° F. the mold was opened and the polyurethane elastomeric bumper was removed from the mold and cemented to a metal bumper member having lights positioned therein to give a bumper assembly having lights that were activatable on signal from the brakes when connected with the battery.

The area of the elastomeric bumper to serve as lens for the lights was masked with masking tape and the rest of the bumper was then painted with an opaque paint of the type approved by the automobile manufacturers for the model and make of vehicle on which the bumper was to be used. When the paint had dried the masking tape was stripped away to leave a bumper having the desired color and lenses therein which were translucent and therefore transmitted light from the light fixtures within the metal bumper members or armature.

While certain representative embodiments and details have been shown for the purpose of illustrating the invention, it will be apparent to those skilled in this art that various changes and modifications may be made therein without departing from the spirit or scope of the invention.

What is claimed is:

1. A bumper structure including a metal portion, an elastomeric material positioned in front of the metal portion and a means for attachment to the body of a vehicle, said metal portion extending around that portion of the body of the vehicle to be protected and having a hole for passage of light from each light fixture associated with the hole, the elastomeric material covering each hole in the metal portion and being transparent or translucent to light; the light fixing including a light having means for attachment in an electric circuit with a power supply and a light activator.

2. The bumper structure of claim 1 wherein the transparent or translucent elastomeric material is selected from the class consisting of polyurethanes, natural rubber, polybutadienestyrene, neoprene, cis polyisoprene, polybutadiene and nitrile rubber.

* * * * *